(12) United States Patent
Blivet et al.

(10) Patent No.: US 8,231,145 B2
(45) Date of Patent: Jul. 31, 2012

(54) CONNECTING DEVICE WITH WELDED BODY

(75) Inventors: Philippe Blivet, Rennes (FR); Philippe Le Quere, Betton (FR); Nicolas Le Bars, Thorigne (FR)

(73) Assignee: Legris SA, Rennes (FR)

( * ) Notice: Subject to any disclaimer, the term of this patent is extended or adjusted under 35 U.S.C. 154(b) by 1039 days.

(21) Appl. No.: 12/091,847

(22) PCT Filed: Oct. 17, 2006

(86) PCT No.: PCT/FR2006/002331
§ 371 (c)(1),
(2), (4) Date: Apr. 28, 2008

(87) PCT Pub. No.: WO2007/048896
PCT Pub. Date: May 3, 2007

(65) Prior Publication Data
US 2008/0296888 A1 Dec. 4, 2008

(30) Foreign Application Priority Data
Oct. 26, 2005 (FR) ...................................... 05 10925

(51) Int. Cl.
*F16L 13/02* (2006.01)
(52) U.S. Cl. ..................................... 285/288.1; 285/317
(58) Field of Classification Search ............... 285/288.1, 285/239, 241, 305, 21.2, 317
See application file for complete search history.

(56) References Cited

U.S. PATENT DOCUMENTS

| | | | | |
|---|---|---|---|---|
| 590,258 A | * | 9/1897 | Dale | 285/241 |
| 3,951,438 A | * | 4/1976 | Scales | 285/247 |
| 4,892,227 A | * | 1/1990 | MacLaughlin | 220/270 |
| 5,277,456 A | * | 1/1994 | Mer et al. | 285/21.2 |
| 5,921,592 A | * | 7/1999 | Donnelly | 285/239 |
| 6,199,916 B1 | * | 3/2001 | Klinger et al. | 285/288.1 |
| 6,279,966 B1 | * | 8/2001 | Kondo et al. | 285/239 |
| 6,733,047 B1 | * | 5/2004 | Stieler | 285/21.1 |
| 6,832,785 B1 | * | 12/2004 | Zitkovic, Jr. | 285/21.1 |
| 6,902,208 B1 | * | 6/2005 | Mobley et al. | 285/21.1 |
| 7,121,592 B2 | * | 10/2006 | Sazbo et al. | 285/305 |
| 7,708,318 B2 | * | 5/2010 | Thrift et al. | 285/256 |

FOREIGN PATENT DOCUMENTS

| | | |
|---|---|---|
| DE | 10 2004 001109 | 8/2005 |
| EP | 1 087 167 | 3/2001 |
| EP | 0 988 488 | 4/2004 |
| FR | 2 822 520 | 9/2002 |

* cited by examiner

*Primary Examiner* — David E Bochna
(74) *Attorney, Agent, or Firm* — Young & Thompson

(57) ABSTRACT

A coupling device includes a tubular body (100) having a plastics material portion provided with an anchor member (5) for anchoring the tubular body in a first duct, the anchor member being made of metal. The anchor member is secured to a metal support element (1) that is covered at least in part in a layer of plastics material (9) compatible with the plastics material of said tubular body portion and that is connected to said portion by local welding of said portion with said layer. A method of fabricating such a coupling device.

19 Claims, 3 Drawing Sheets

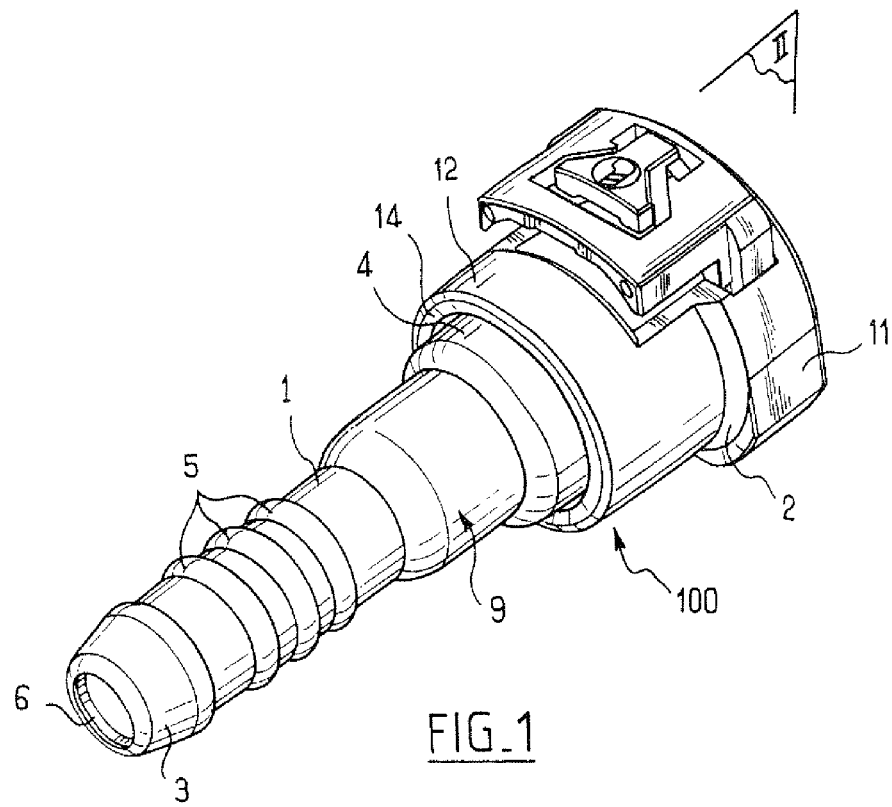
FIG_1
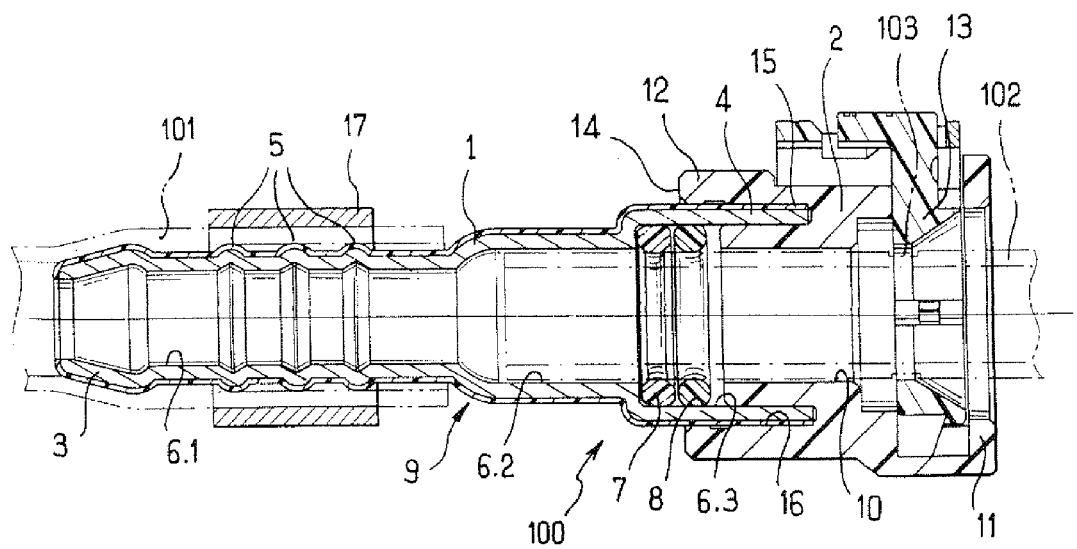
FIG_2

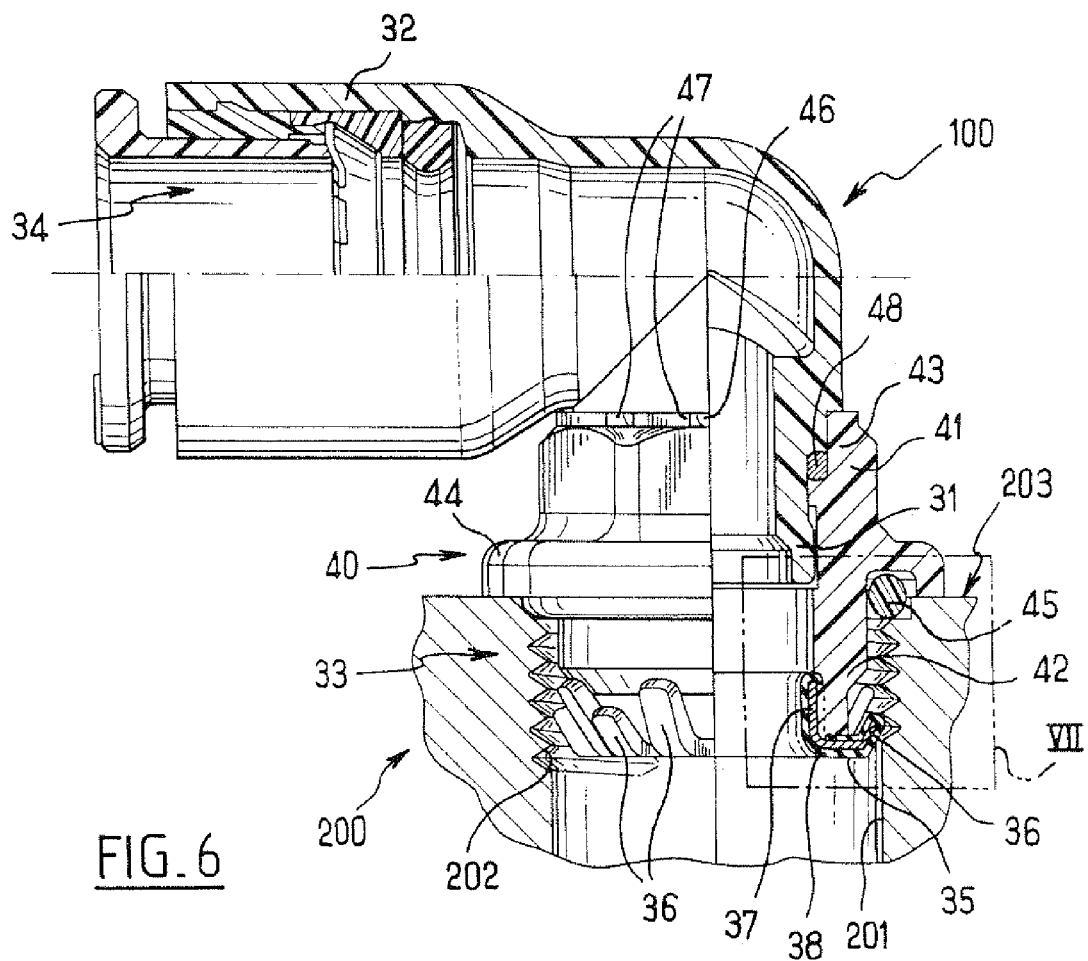
FIG_6
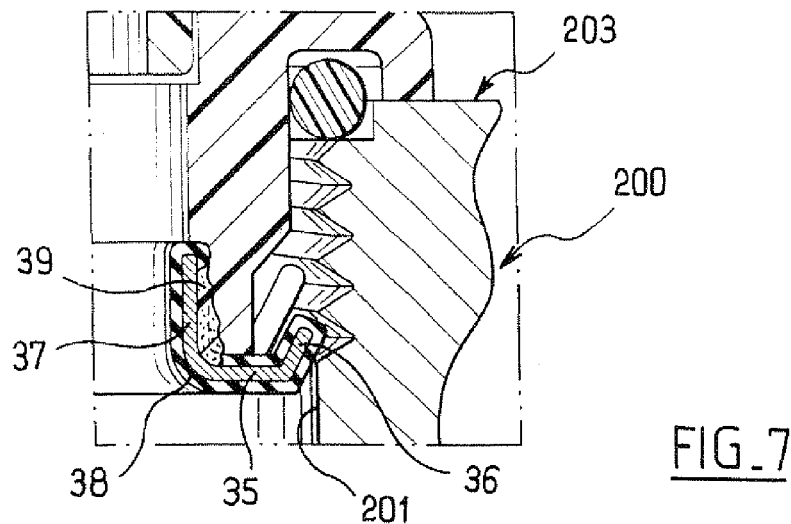
FIG_7

CONNECTING DEVICE WITH WELDED BODY

The present invention relates to a device for coupling two ducts in a fluid transport circuit. The invention also relates to a method of fabricating such a coupling device.

BACKGROUND OF THE INVENTION

A coupling device comprises a tubular body having a first connection section and a second connection section for co-operating respectively with a first duct and with a second duct. The first connection section is arranged to be engaged by force in one end of the first duct, and the second connection section is arranged, for example, to receive one end of the second duct and to retain it, e.g. by means of a radial latch or a clamp.

Such coupling devices need to be capable of withstanding numerous stresses, in particular when they are fitted to motor vehicles, which constitute surroundings that are very demanding.

Thus, coupling devices are highly stressed mechanically and they need to be capable in particular of withstanding the pressure of the fluid in the circuit, forces exerted by the pipe end and by the tubular element, vibration that results from operation of the vehicle, impacts, in particular in the event of/a vehicle accident, .... These stresses are in addition to the large variations in temperature that exist between winter low temperatures and high temperatures in the vicinity of an engine that is running.

Couplings must also present low permeability to the fluids they convey and must withstand them chemically as well as the fluids with which they might into contact in the vehicle.

Coupling devices must also be reliable, easy to make, and inexpensive.

The structure of coupling devices is thus the result of making a compromise in satisfying those requirements.

The tubular body is thus generally molded as a single piece of plastics material, thereby making it possible to obtain coupling devices that are lighter in weight than metal coupling devices, and inexpensive providing they are simple in shape. The use of a body that is made entirely out of plastics material can however be penalizing concerning the mechanical strength of the coupling device and also the permeability of the coupling device to the fluid it conveys, unless use is made of a plastics material that is very elaborate and therefore expensive, or unless the wall of the tubular body is thickened, thereby nevertheless increasing its weight and bulk.

In order to improve the anchoring of the first connection section in the first duct, it is known to fit a metal anchor member thereto. The anchor member may be merely a toothed washer received in a groove of the tubular body. Mounting the anchor member in that way requires the body to be made in two portions that are generally snap-fastened together, thereby increasing the cost of fabricating the tubular body. The anchor member is then free to rotate relative to the body, which can therefore pivot relative to the first duct, and that can be troublesome in certain applications. Fastening the anchor member to the body is generally difficult and in certain configurations there is a risk of the anchor member becoming lost prior to the coupling device being mounted in the first duct. To solve this problem, it is possible to overmold the tubular body onto the anchor member. Nevertheless that increases the cost of fabricating the tubular body.

OBJECT OF THE INVENTION

An object of the invention is to provide a coupling device that does not present all or some of the above-mentioned drawbacks.

SUMMARY OF THE INVENTION

To this end, the invention provides a coupling device comprising a tubular body having a plastics material portion provided with an anchor member for anchoring the tubular body in a first duct, the anchor member being made of metal, the anchor member being secured to a metal support element covered at least in part in a layer of plastics material compatible with the plastics material of said tubular body portion and connected to said portion by local welding of said portion with said layer.

Thus, the anchor member is fastened in simple and secure manner such that the anchor member provides firm retention of the tubular body in the first duct.

Preferably, the layer of plastics material covers the anchor member.

The layer of plastics material can thus protect the anchor member against corrosion or against chemical attack by the fluid being conveyed. In addition, when the first duct is tapped, the anchor member is arranged to bear against the thread of the tapping. The layer of plastics material prevents direct contact between the metal of the anchor member and the thread, which direct contact would lead to the thread being machined, thereby generating shavings that would run the risk of polluting the conveyed fluid or the risk of damaging devices coupled to the fluid-conveying circuit downstream from the coupling device.

More preferably, the anchor member is a toothed washer secured to one end of a bushing that is received in the tubular body and forms the support element.

The support element is thus simple in shape and provides an area that is sufficient to achieve a strong weld, enabling the anchor member to be held rigidly to the tubular body.

In a particular embodiment, the tubular body comprises a first connection section and a second connection section for co-operating respectively with the first duct and with a second duct, the first connection section forming the support element for the anchor member and being arranged to be engaged by force in one end of the first duct, the second connection section forming the plastics material portion of the tubular body, the first connection element having a bonding end covered in the layer of plastics material and connected by welding to a bonding end for bonding the second connection section to the first connection section, and the first connection section defining a channel having an end length that is designed to receive a terminal portion of the second duct and that is provided with means for bonding it in leaktight manner to the terminal portion of the second duct.

Making the tubular body as two parts, one of them being made of metal and the other of plastics material, gives the tubular body relatively great mechanical strength and low permeability, while also limiting the impact of using metal on the weight and the cost of the coupling device. Since the sealing of the connection between the second duct and the coupling device is provided in the first connection section, there is no need for the weld between the first connection section and the second connection section to be leaktight.

Advantageously, the bonding end of the second connection section is provided with an annular housing for receiving the bonding end of the first connection section, the annular housing being defined by two coaxial cylindrical walls, the outer wall thereof being provided with a friction zone for rubbing against an outer portion of the bonding end of the first connection section during welding.

This enables a rigid bond to be achieved between the first connection section and the second connection section.

The invention also provides a method of fabricating such a coupling device. The method comprises the steps of applying the layer of the support element against the plastics material portion of the tubular body and of setting the support element and the plastics material portion of the tubular body into relative motion in order to perform friction welding.

This implementation is particularly simple.

Advantageously, the tubular body comprises a first connection section and a second connection section for co-operating respectively with the first duct and with a second duct, the first connection section forming the support element of the anchor member and being arranged to be engaged by force in one end of the first duct, the second connection section forming the plastics material portion of the tubular body, the method including the step of orienting the first connection section relative to the second connection section to occupy a final orientation for the connection sections, the connection sections being caused to rub against each other by vibration while maintaining the final orientation.

This makes it possible to achieve different orientations starting with identical connection sections, whereas with a fabrication method involving injecting a plastics material, achieving a plurality of orientations requires a mold to be available for each orientation.

Other characteristics and advantages of the invention appear on reading the following description of particular, non-limiting embodiments of the invention.

BRIEF DESCRIPTION OF THE DRAWINGS

Reference is made to the accompanying drawings, in which:

FIG. 1 is a perspective view of a coupling device constituting a first embodiment of the invention;

FIG. 2 is a section view on plane II of FIG. 1, showing said device;

FIG. 6 is a view analogous to the view of FIG. 2 showing a device constituting a second embodiment; and FIG. 7 is a detail view of a zone VII in FIG. 6.

DETAILED DESCRIPTION OF THE INVENTION

Figure 3:
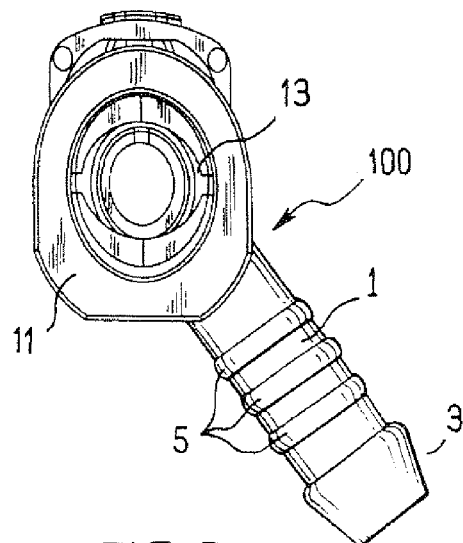
FIG. 3 is an end view of a device constituting a first variant of the first embodiment.

With reference to FIGS. 1 and 2, the device constituting a first embodiment of the invention is arranged to couple a first duct 101 with a second duct 102, which ducts are represented by chain-dotted lines in FIG. 2. Specifically, the first duct 101 is a pipe and the second duct 102 is a tubular endpiece provided with a stop shoulder constituted in this example by a groove 103. The stop shoulder may also be formed by a bead.

The device comprises a body given overall reference 100, that is of tubular shape having a first connection section 1 and a second connection section 2 for co-operating respectively with the first duct 101 and with the second duct 102.

The first connection section 1, of tubular shape, has an end portion 3 arranged to be engaged by force in one end of the first duct 101, and an end portion 4 for bonding with the second connection section 2. The end portion 3 is in the form of a teat and it is provided externally with annular beads 5 for anchoring the end portion 3 in the first duct 101. The end portion 4 is of a staged shape flaring away from the end portion 3 towards the end portion 4. The first connection section 1 defines a staged channel 6 having an end length 6.1 extending in the end portion 3 and having a diameter that is substantially equal to the inside diameter of the second duct 102, a middle length 6.2 having a diameter substantially equal to the outside diameter of the second duct 102, and an end length 6.3 extending in the end portion 4 and receiving two sealing rings 7, 8 of inside diameter slightly smaller than the outside diameter of the second duct 102. The first connection section 1 is made of metal and possesses an outside surface that is covered in a protective layer 9 of plastics material, and more specifically in this example of polyamide. By way of example, the protective layer 9 is made by dipping, or else by spraying or electrostatically depositing the plastics material, followed by melting.

Over its entire length, the second connection section 2 of tubular shape defines a channel 10 of diameter greater than the outside diameter of the second duct 102 and it has an end portion 11 for receiving one end of the second duct 102, and an end portion 12 for bonding to the first connection section 1. The end portion 11 is provided with retaining means for retaining the second duct 102 in the channel 10. These retaining means, known in themselves, are constituted in this example by a resilient ring 13 that is elastically deformable radially between a retaining state in which the resilient ring 13 is at rest and has portions projecting into the channel 10, and a deformed, release state in which said portions are retracted into the channel 10. The end portion 12 has a terminal face 14 extending perpendicularly to the channel 10 and having an annular housing 15 formed therein to receive the end portion 4 of the first connection section 1. The housing 15 is defined by two cylindrical walls coaxial about the channel 10. The second connection section 2 is made of plastics material, and more particularly in this example of polyamide.

The first connection section 1 is connected to the second connection section 2 by welding the end portion 4 in the housing 15 of the end portion 12. The welding is friction welding performed by causing the end portion 4 to move relative to a friction zone 16 formed on an outside wall of the housing 15 so as to cause local melting of the protective layer 9 and of the adjacent plastics material of the outer wall of the housing 15. The relative movement may be movement in rotation or it may result from vibration.

In use, the first connection section 1 is engaged by force in the end of the first duct 101, and a ring 17 is crimped onto the first duct 101 over the portions in relief 5 of the end portion 3, so the first connection section 1 must therefore be arranged (and in particular must have sufficient thickness) to be able to withstand the crimping force of the ring 17.

The end of the second duct 102 is engaged through the deformed resilient ring 13 into the channel 10 and then into the end length 6.3 and the middle length 6.2 until the resilient ring 13 comes into register with the groove 103 and returns to its retaining state so as to project into the groove 103 and oppose movement of the second duct 102. The sealing rings 7, 8 are then compressed radially between the end of the second duct 102 and the wall of the end length 6.3. The welding does not need to be leaktight.

Figure 4:
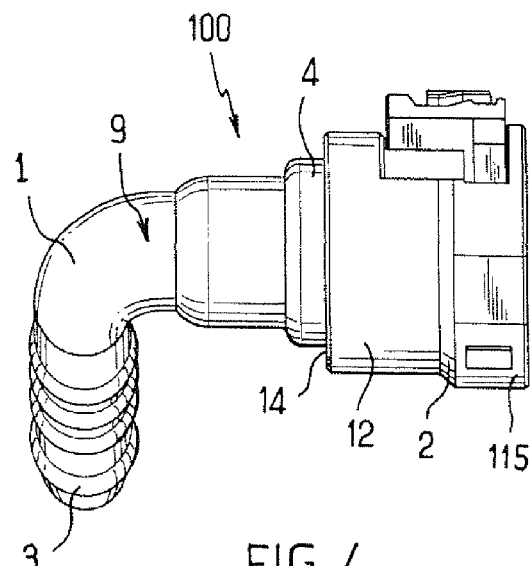
FIG. 4 is a side view of said device.

In a first variant of the first embodiment, as shown in FIGS. 3 and 4, the body 100 has a bend (the bend in this example being situated in the end portion 4 of the first connection section 1). Since the resilient ring 13 has an actuator portion enabling it to be deformed and that projects from one side of the second connection section (the second connection section not being a body of revolution), it is necessary for the connection sections 1 and 2 to be oriented relative to each other so as to avoid the actuator portion being in a position that is difficult to access once the connection section 1 has been implanted, e.g. in the duct of a stationary element of a fluid transport circuit.

The method of fabricating this coupling device comprises steps of orientating the first connection section 1 relative to the second connection section 2 to occupy a final orientation for the connection sections 1 and 2 relative to each other, and in causing the connection sections 1 and 2 to rub against each other by means of vibration while holding them in the final orientation.

Figure 5:
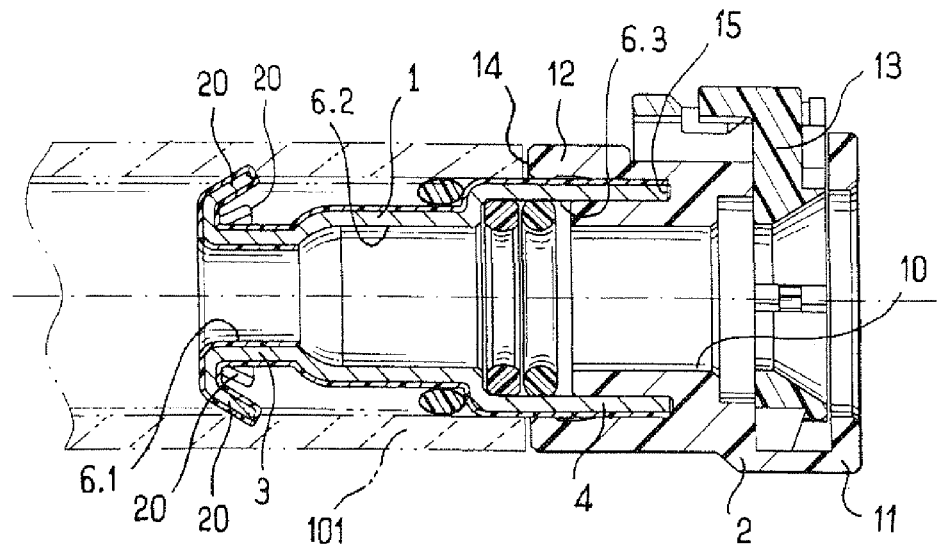
FIG. 5 is a view analogous to the view of FIG. 2 showing a device constituting a second variant of the first embodiment.

In a second variant shown in FIG. 5, the first connection section 1 has the free end of the end portion 3 provided with outwardly-projecting teeth 20 for anchoring the first connection section 1 in a first duct 101 that may be smooth or tapped.

Elements that are identical or analogous are given the same numerical references in the following description relating to a second embodiment.

With reference to FIGS. 6 and 7, the device constituting a second embodiment of the invention is arranged to couple a pipe end (not shown in the figures) to a circuit element. The coupling device is designed to be mounted on a circuit element given overall reference 200, having a duct 201 with an end portion 202 opening out in a surface 203 of the circuit element 200. The circuit element 200 may be a fluid delivery or receiver element, such as another pipe, a pump, a manifold, an actuator, a valve, . . . , for example.

The coupling device constituting the second embodiment of the invention has a tubular body given overall reference 100, and in this example it presents a 90° bend. The tubular body 100 is made as a single piece of plastics material such as polyamide.

The tubular body 100 has a first end portion 31 with means, given overall reference 33, for anchoring it in the end portion 202 of the channel 201, and a second end 32 provided with a housing for receiving the end of the pipe, and means given overall reference 34 for securing the pipe end thereto in leaktight manner. The leaktight securing means 34 are quick-connection means that are themselves known (see for example document FR-A-2 810 087) and are not described in detail herein. These securing means may equally well be connection means that are not quick-connection means.

The anchor means 33 comprise a base given overall reference 40, for bearing against the surface 203 of the second circuit 200. The base 40 has a bushing 41 with a first end 42 for insertion into the end portion 202 of the channel 201, and a second end 43 for projecting out therefrom.

The bushing 41 is provided externally between its two ends 42, 43 with a collar 44 having a bottom surface that is designed to bear against the surface 203 of the circuit element 200. The bottom surface of the collar 44 is provided with a plane groove that receives in conventional manner a deformable sealing ring 45.

The tubular body 100 is received in the bushing 41 of the base 40 by sliding between an operating position and a disassembly position. The tubular body 100 and the base 40 are provided with complementary engagement means that are arranged in such a manner as to be disengaged from each other when the tubular body 100 is in the operating position (the tubular body 100 then being free to turn relative to the base 40), and that they co-operate with each other when the tubular body 100 is in the disassembly position (the tubular body 100 is then constrained to rotate with the base 40). These complementary engagement means are constituted in this example by axial projections 46 arranged on the tubular body 100 and axial setbacks 47 arranged in the end 43 of the bushing 41 of the base 40 in order to receive the axial projections 46 of the tubular body 100 when it is in the disassembly position.

On the end portion 42 there is mounted an anchor washer 35 possessing an outside circumference that is subdivided into a plurality of teeth 36 arranged in such a manner that the anchor washer 35 is elastically deformable between an open state in which the anchor washer 35 has an outside diameter greater than the inside diameter of the end portion 202 of the channel 201, and a closed state in which the anchor washer 35 has an outside diameter less than the inside diameter of the end portion 202 of the channel 201.

The anchor washer 35 is secured to a bushing 37 received in the end 42 of the tubular body 100. The bushing 37 constitutes a support element for supporting the anchor washer 35. The anchor washer 35 and the bushing 37 are both made of metal covered in a protective layer 38 of plastics material. The anchor washer 35 and the bushing 37 may form a single part, or they may be welded together. The bushing 37 is connected to the end 31 of the tubular body 100 by a weld 39 that results from local melting of the protective layer 38 and of the wall of the end 31. The welding is preferably friction welding.

The coupling device is put into place by inserting the end portion 42 of the bushing 41 of the tubular body 100 by force into the end portion 202 of the channel 201 until the base 40 comes into abutment against the surface 203. At least one of the teeth 36 of the anchor washer 35 is then moved away and its end face bears against the thread of the end portion 202.

Disassembly is performed by bringing the tubular body 100 into its disassembly position and by causing it to pivot so as to unscrew the coupling device.

It should be observed that in the same manner it is also possible during assembly to screw the coupling device a little so as to press the base 40 thoroughly against the surface 203.

It should be observed that the deformable sealing ring 48 is interposed between two shoulders, one belonging to the tubular body 100 and the other the bushing 41. The sealing ring 48 exerts a resilient return force urging the tubular body 100 towards the operating position. In addition, when the circuit in which the coupling device is implanted is under pressure, the fluid under pressure pushes the tubular body 100 towards the operating position.

Naturally, the invention is not limited to the embodiment described and it covers any variant coming within the ambit of the invention as defined by the claims.

In particular, it is possible that the protective layer covers only the portion for welding.

The invention claimed is:

1. A coupling device comprising:
a tubular body (100) having a plastics material portion (2) secured to a metal support element (37, 1),
the metal support element (37, 1) provided with an anchor member (35; 5; 20), the anchor member for anchoring the tubular body in a first duct (101) with the first duct (101) in contact with and covering the anchor member; and
a layer of plastics material (39; 9) covering, at least in part, the metal support element (37, 1), the plastics material compatible with the plastics material of said plastics material portion (2),
the metal support element (37, 1) and the layer of plastics material (39, 9) extending into and welded to the plastics material portion (2), wherein the layer (39; 9) of plastics material covers the anchor member (35; 5; 20).

2. A device according to claim 1, in which the anchor member (35) is a toothed washer secured to one end of a bushing (37) that is received in the tubular body (100) and forms the support element.

3. A device according to claim 1, wherein the tubular body comprises a first connection section (1) and a second connection section (2) for co-operating respectively with the first duct (101) and with a second duct (102), the first connection section forming the support element for the anchor member and being arranged to be engaged by force in one end of the first duct, the second connection section forming the plastics material portion of the tubular body, wherein the first connection element has a bonding end (4) covered in the layer (9) of plastics material and connected by welding to a bonding end (12) for bonding the second connection section to the first connection section, and wherein the first connection section defines a channel (6) having an end length (6.3) that is designed to receive a terminal portion of the second duct (102) and that is provided with means (7, 9) for bonding the channel in leaktight manner to the terminal portion of the second duct.

4. A device according to claim 3, in which the bonding end (12) of the second connection section (2) is provided with an annular housing (15) for receiving the bonding end (4) of the first connection section (1), the annular housing being defined by two coaxial cylindrical walls, the outer wall thereof being provided with a friction zone (16) for rubbing against an outer portion of the bonding end (4) of the first connection section during welding.

5. A device according to claim 4, in which the first connection section (1) is arranged to withstand a force for crimping a ring (17) on the end of the first duct (101) engaged on the first connection section.

6. A device according to claim 4, in which the layer (9) of plastics material covers the entire outside surface of the first connection section (1).

7. A device according to claim 4, in which the anchor member (5; 20) comprises at least one external portion in relief formed on the first connection section (1).

8. A method of fabricating a coupling device according to claim 1, comprising the steps of applying the layer (9; 38) of the support element (1; 37) against the plastics material portion of the tubular body (100) and of setting the support element and the plastics material portion of the tubular body into relative motion in order to perform friction welding.

9. A method according to claim 8, in which the relative motion is rotary motion.

10. A method according to claim 8, in which the relative motion is obtained by vibration.

11. A method according to claim 8, the tubular body comprising a first connection section (37, 1) and a second connection section (2) for co-operating respectively with the first duct (101) and with a second duct (102), the first connection section forming the support element of the anchor member and being arranged to be engaged by force in one end of the first duct, the second connection section forming the plastics material portion of the tubular body, the method including the step of orienting the first connection section relative to the second connection section to occupy a final orientation for the connection sections, the connection sections being caused to rub against each other by vibration while maintaining the final orientation.

12. The coupling device of claim 1 in combination with the first duct (101) and the second duct (102), wherein the coupling device is coupled to the first duct (101) and is coupled to the second duct (102), the first duct being a pipe and the second duct being a tubular endpiece provided with a stop shoulder.

13. A coupling device for coupling to a first duct (101) and to a second duct (102), the coupling device comprising:
a tubular body (100) having i) a first metal connection section (1) and ii) a second plastic connection section (2), the first connection section (1) for coupling with the first duct (101) and the second connection section (2) for coupling with the second duct (102), wherein,
the first connection section (1) is of tubular shape and has i) a first end portion (3) arranged to be engaged by force in one end of the first duct (101), and ii) an opposite, second end portion (4) engaged into and bonded with the second connection section (2),
the first end portion (3) provided with an anchor member (35; 5; 20), the anchor member for anchoring the first end portion (3) in the first duct (101) with the first duct (101) in contact with the anchor member,
the first connection section (1) defines a staged channel (6) having an end length (6.1) extending in the first end portion (3) and having a diameter substantially equal to an inside diameter of the second duct (102), a middle length (6.2) having a diameter substantially equal to an outside diameter of the second duct (102), and an end length (6.3) extending in the second end portion (4),
the second connection section (2) is of tubular shape and defines a channel (10) of diameter greater than an outside diameter of the second duct (102),
the second connection section (2) having i) a third end portion (11) for receiving one end of the second duct (102), and ii) an opposite, fourth end portion (12) for bonding to the first connection section (1),
the fourth end portion (12) has a terminal face (14) and an annular housing (15) formed in the terminal face (14), the annular housing (15) defined by an outer cylindrical wall and an inner cylindrical wall, the outer and inner cylindrical walls coaxial about the channel (10),
the second end portion (4) of the first connection section (1) is received in the annular housing (15) between the inner and outer cylindrical walls; and
a layer (9) of plastics material covering an outside surface of the first connection section (1), wherein,
a part of the layer (9) of plastics material covering the outside surface of the first connection section (1) is received in the annular housing (15) intermediate i) the second end portion (4) received in the annular housing and ii) the outer cylindrical wall, and
the second end portion (4) of the first connection section (1) and layer (9) of plastics material received in the annular housing (15) are welded to the second connection section (2) in the housing (15) of the second connection section (2).

14. The coupling device of claim 13, further comprising:
a sealing ring (7, 8) of an inside diameter smaller than the outside diameter of the second duct (102), the sealing ring (7, 8) located inside the second end portion (4) and, in use, being compressed by a terminal portion of the second duct (102); and
a retaining part provided for the third end portion (11), the retaining part (13) arranged to retain the second duct (102) in the channel (10), the retaining part (13) being elastically deformable radially between i) a retaining state in which the resilient part (13) is at rest and has portions projecting into the channel (10), and ii) a deformed, release state in which said portions are retracted into the channel 10.

15. The coupling device of claim 13, wherein, the first end portion (3) has a teat form and the anchoring member comprises external annular beads (5) for anchoring the first end portion (3) in the first duct (101), and the second end portion (4) has a staged shape flaring away from the first end portion (3) towards the second connection section (2).

16. The coupling device of claim 13, wherein, the first connection section is a bushing (37), and the anchoring member is a toothed washer (35) secured to one end of the bushing (37).

17. A coupling device, comprising:

a tubular body (100) having i) a first metal connection section (1) and ii) a second plastic connection section (2), the first connection section (1) for coupling with a first duct (101) and the second connection section (2) for coupling with a second duct (102), wherein, the first connection section (1) has i) a first end portion (3) configured to be engaged in one end of the first duct (101), and ii) an opposite, second end portion (4) engaged into and bonded with the second connection section (2), the first end portion (3) provided with an anchor member (35; 5; 20), the anchor member for anchoring the first end portion (3) in the first duct (101) with the first duct (101) in contact with the anchor member, the second connection section (2) defines a channel (10) of diameter greater than an outside diameter of the second duct (102), the second connection section (2) having i) a third end portion (11) for receiving one end of the second duct (102), and ii) an opposite, fourth end portion (12) for bonding to the first connection section (1), the fourth end portion (12) has a terminal face (14) and an annular housing (15) formed in the terminal face (14), the annular housing (15) defined by an outer cylindrical wall and an inner cylindrical wall, the outer and inner cylindrical walls coaxial about the channel (10), the second end portion (4) of the first connection section (1) is received in the annular housing (15) between the inner and outer cylindrical walls; and a layer (9) of plastics material covering an outside surface of the first connection section (1), wherein, a part of the layer (9) of plastics material covering the outside surface of the first connection section (1) is received in the annular housing (15) intermediate i) the second end portion (4) received in the annular housing and ii) the outer cylindrical wall, and the second end portion (4) of the first connection section (1) and layer (9) of plastics material received in the annular housing (15) are welded to the second connection section (2) in the housing (15) of the second connection section (2).

18. The coupling device of claim 17, further comprising:

a sealing ring (7, 8) of an inside diameter smaller than the outside diameter of the second duct (102), the sealing ring (7, 8) located inside the second end portion (4) and, in use, being compressed by a terminal portion of the second duct (102); and a retaining part provided for the third end portion (11), the retaining part (13) arranged to retain the second duct (102) in the channel (10), the retaining part (13) being elastically deformable radially between i) a retaining state in which the resilient part (13) is at rest and has portions projecting into the channel (10), and ii) a deformed, release state in which said portions are retracted into the channel 10.

19. The coupling device of claim 17, wherein, the first connection section is a bushing (37), and the anchoring member is a toothed washer (35) secured to one end of the bushing (37).

\* \* \* \* \*